US008024559B2

(12) United States Patent
Jung et al.

(10) Patent No.: US 8,024,559 B2
(45) Date of Patent: Sep. 20, 2011

(54) SECURITY AUTHENTICATION SYSTEM AND METHOD (75) Inventors: Young-Sik Jung, Seoul (KR); In-Hyuk Choi, Gyeonggi-do (KR); Min-Chol Song, Seoul (KR); Jong-Won Paek, Gyeonggi-do (KR); Sung-Ho Lee, Seoul (KR); Sang-Hee Bang, Seoul (KR); Sang-Hun Jeon, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 661 days.

(21) Appl. No.: 12/098,642

(22) Filed: Apr. 7, 2008

(65) Prior Publication Data
US 2009/0259839 A1 Oct. 15, 2009

(30) Foreign Application Priority Data

Jul. 12, 2007 (KR) ........................ 10-2007-0069968

(51) Int. Cl.
H04L 29/06 (2006.01)
H04L 9/32 (2006.01)
G06F 15/173 (2006.01)
G06F 7/04 (2006.01)
G06F 17/30 (2006.01)
H04N 7/16 (2006.01)

(52) U.S. Cl. ........ 713/155; 713/167; 713/168; 713/170; 709/223; 726/2; 726/3; 726/21; 726/28

(58) Field of Classification Search ........................ None
See application file for complete search history.

(56) References Cited

U.S. PATENT DOCUMENTS

| 7,139,918 B2* | 11/2006 | Chang et al. .................. 713/193 |
| 2002/0099942 A1* | 7/2002 | Gohl .............................. 713/169 |
| 2003/0033524 A1* | 2/2003 | Tran et al. ..................... 713/168 |
| 2003/0056121 A1* | 3/2003 | Kimoto et al. ................ 713/202 |
| 2003/0097593 A1* | 5/2003 | Sawa et al. .................... 713/201 |
| 2004/0225878 A1* | 11/2004 | Costa-Requena et al. ..... 713/150 |
| 2005/0015474 A1* | 1/2005 | Kavacheri et al. ............ 709/223 |
| 2006/0089124 A1* | 4/2006 | Frank et al. ................... 455/411 |
| 2006/0282660 A1* | 12/2006 | Varghese et al. .............. 713/155 |
| 2009/0222914 A1* | 9/2009 | Ozawa ............................ 726/21 |

FOREIGN PATENT DOCUMENTS

| CN | 1913701 | 2/2007 |
| JP | 11-224236 | 8/1999 |
| JP | 2003-157234 | 5/2003 |
| JP | 2004-527938 | 9/2004 |
| WO | 02/060119 | 8/2002 |

* cited by examiner

OTHER PUBLICATIONS

Chinese Office Action of Chinese Publication No. 2010072700314570 issued on Jul. 30, 2010, corresponding to U.S. Appl. No. 12/098,642.

*Primary Examiner* — Shin-Hon Chen
(74) *Attorney, Agent, or Firm* — H.C. Park & Associates, PLC (57) ABSTRACT Authentication system and method are provided. The authentication system includes: a server configured to provide at least two security levels and configured to transmit one of at least two security modules corresponding to the security level of a user terminal, via communications network, to the user terminal based, at least in part, upon an environment of the user terminal; and an authentication server communicatively linked with the server and configured to perform a user authentication in response to a user authentication request from the user terminal. Accordingly, various hackings can be prevented and the user authentication can be accomplished with user's convenience and security.

20 Claims, 8 Drawing Sheets

SECURITY AUTHENTICATION SYSTEM AND METHOD

CROSS-REFERENCE TO RELATED APPLICATIONS

This application claims the benefit under 35 U.S.C. §119 (a) from Korean Patent Application No. 10-2007-0069968 filed on Jul. 12, 2007, the entire disclosure of which is incorporated herein by reference.

BACKGROUND OF THE INVENTION

1. Field of the Invention

The present invention relates to an authentication system and method. More particularly, the present invention relates to security authentication system and method for preventing the leak of user information and authenticating a user.

2. Description of the Related Art

Internet has become a must in a present-day life, and Internet services such as electronic commerce, Internet banking, and online game, are prevalently used. To use the Internet service, a user generally needs to join as a member of the corresponding service and pass through user authentication to use the corresponding service. The user authentication is performed in a manner that the user inputs his/her identification (ID) and password in a web browser of a user terminal, the ID and the password are transmitted to a server, and the server confirms the ID and the password.

Crimes which install a hacking tool in other user terminals, extract and user ID and password by stealth are increasing. An example of the hacking tool is a browser helper object (BHO). The BHO, which was originally invented to extend the functionality of the web browser, supports functions not provided by the web browser. Most BHOs are used as spyware, adware, and hacking against its original purpose. Particularly, the BHO is used to intercept user authentication information transmitted from the user terminal to the server in the process of the user authentication. Another example of the hacking tool is a key logger. The key logger steals keyboard information input by the user and leaks out the information.

To prevent the hacking by the hacking tools, many security programs are under development. Most security programs find and remove the hacking tools in the user terminal or encrypt the user authentication information to avoid the hacking. It is not easy for the user to select and install his/her proper or desired security program among various security programs.

BRIEF SUMMARY OF THE INVENTION

An aspect of the present invention is to provide security authentication system and method for preventing various hacking schemes, providing convenience and security to a user, and authenticating the user.

According to the aspect of the present invention, a security authentication system includes: a server configured to provide at least two security levels and configured to transmit one of at least two security modules corresponding to the security level of a user terminal, via communications network, to the user terminal based, at least in part, upon an environment of the user terminal; and an authentication server communicatively linked with the server and configured to perform a user authentication in response to a user authentication request from the user terminal. The server determines the security level of the user terminal by checking if at least one of predetermined programs is installed in the user terminal. When the user selects one of the at least two security levels, the server may transmit a security module corresponding to a security level selected by the user.

The authentication server is configured to send a public key and a session key to the user terminal and configured to receive a ciphertext encrypted with the public key and the session key from the user terminal.

The at least two security modules encrypt an identification (ID) and a password input by the user and transmit the encrypted ID and password to the authentication server. The at least two security modules include a first security module generated with a script language and executed in a browser; a second security module executed by the first program and generating a login window to block the browser from recognizing an ID and a password input in the login window; and a third security module installed to the user terminal using an ActiveX for generating a fake signal by receiving an input signal from an input device of the user terminal and providing the fake signal to the browser.

The web server is configured to transmit the second security module to the user terminal when one of the predetermined programs is installed in the user terminal and configured to transmit the first security module to the user terminal when none of the predetermined programs is installed in the user terminal.

The at least two security levels include first, second, third security levels corresponding to the first, second, and third security modules respectively. When the user selects one of the first, second, and third security levels, the web server transmits the security module corresponding to the selected security level to the user terminal. One of the predetermined programs is a flash player.

According to the aspect of the present invention, an authentication method includes: providing at least two security levels; transmitting one of at least two security modules corresponding to security level of a user terminal, via communications network, to the user terminal based, at least in part, upon an environment of the user terminal; receiving, via communications network, a user authentication request from the user terminal; and performing a user authentication in response to the user authentication request.

According to another aspect of the present invention, a computer-readable medium contains a program to execute the above method in a computer.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts.

DETAILED DESCRIPTION OF THE INVENTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
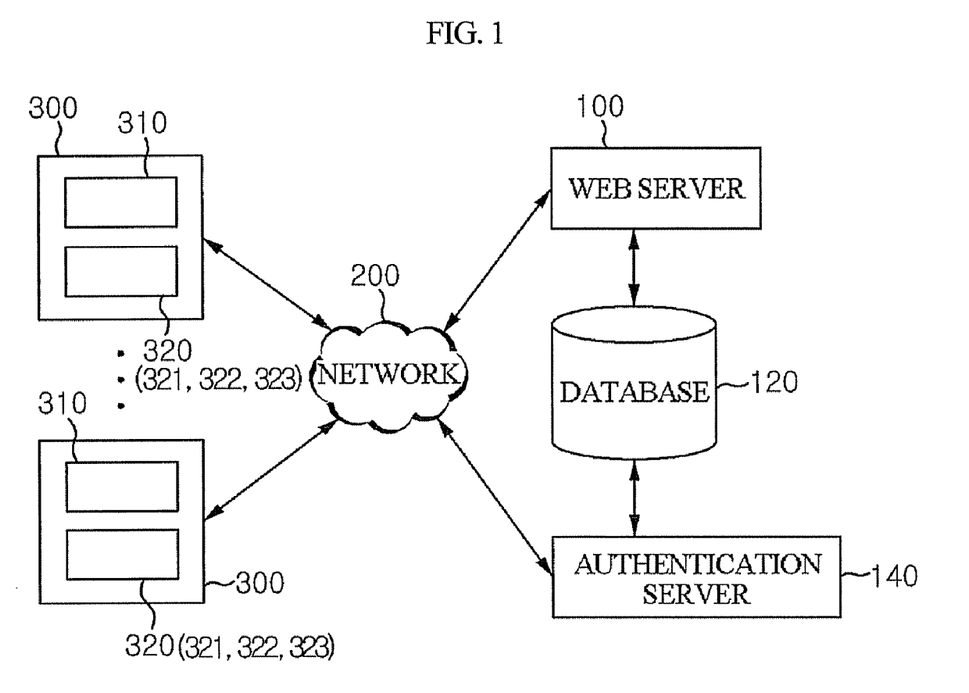
FIG. 1 is a block diagram of a security authentication system according to an embodiment of the present invention.

First, a security authentication system according to an embodiment of the present invention is illustrated in detail by referring to FIG. 1.

FIG. 1 is a block diagram of the security authentication system according to an embodiment of the present invention.

The security authentication system of FIG. 1 includes a web server 100, a user information database 120, and an authentication server 140, which are connected to a plurality of user terminals 300 over a communication network 200.

The user terminal 300 accesses to and communicates with an Internet service system (not shown) which provides Internet service, the web server 100, and the authentication server 140 over the communication network 200. The user terminal 300 can employ a terminal having the operational capability with a memory means and a microprocessor, such as desktop computer, notebook computer, work station, palmtop computer, personal digital assistant (PDA), and web pad.

To use the Internet service, a user gains membership by inputting his/her personal information such as name, resident registration number, ID (or user ID code), and password through the user terminal 300, submitting the personal information to an Internet service provider, and passing through a certain procedure. When the user becomes the member, he/she can use the Internet service.

The user terminal 300 includes a browser 310 and a security module 320.

The browser 310 is installed to the user terminal 300. The browser 310 can perform various functions by accessing a service system, the web server 100, and the authentication server 140 over the communication network 200 according to the user's manipulation. Examples of the browser 310 can include, but not limited to, Microsoft Internet Explorer, a Netscape, Mozilla, and Firefox. The present invention can employ any browser capable of communicating with the Internet service system, the web server 100, and the authentication server 140.

The browser 310 displays a web page including a login window based on the web page information received from the web server 100. The user requests user authentication by inputting his/her ID and password in the login window, and the browser 310 receives authentication success message or authentication failure message from the authentication server 140 and displays the received message on the user terminal 300.

The security module 320 encrypts the user information including the ID and the password input by the user through the user terminal 300, with a session key and a public key received from the authentication server 140. The security module 320 can encrypt the user information using various encryption schemes. By way of example, the security module 320 can use, but not limited to, a Rivest-Shamir-Adleman (RSA) algorithm among the public key encryption algorithms. The security module 320 may encrypt the user information using a hybrid algorithm of the public key system and the symmetric key system. Logic for encrypting the user information can be written with every language such as JavaScript, Flash, C, C++, and Java. Even when the authentication data encrypted by the security module 320 is captured by the hacking tool during the transmission, it is impossible to extract the user information from the encrypted authentication data.

The security module 320 can include one of a first security module 321, a second security module 322, and a third security module 323, which correspond to a first security level, a second security level, and a third security level respectively. When the user selects any one of the first security level, the second security level, and the third security level, the security module 320 corresponding to the security level selected by the user is transmitted from the web server 100 and activated at the user terminal 300.

The first security level indicates a normal security level and can be applied to the user terminal 300 without a flash player. At the first security level, the user information is protected by the first security module 321. The second security level indicates a security level (the recommended level) over a certain level and can be applied to the user terminal 300 with the flash player installed. At the second security level, the user information is protected by the second security module 322 and the effect of the first security level is included. The third security level indicates the highest security level and is applied to the user terminal 300 which requires the perfect security. At the third security level, the user information is protected by the third security module 323 and the effects of the first and second security levels are included.

The first security module 321 can be a set of commands written in a script language. The first security module 321 is translated and executed in the browser 310 in the systematic association with hypertext markup language (HTML). For example, the first security module 321 can be generated using, but not limited to, JavaScript or Visual Basic Script. The first security module 321 encrypts the ID and the password input in the login window and provides the encrypted ID and password to the browser 310 so that the browser 310 forwards the encrypted authentication data to the authentication server 140. Hence, even when the BHO, which is the hacking tool, accesses to a browser event such as Page up/down and Previous, and captures the authentication data in the browser 310 (BHO browser event hooking), the encrypted user authentication data is not exposed.

The second security module 322 can be created as a flash file played by the flash player installed to the user terminal 300. The second security module 322 displays the login window generated using the flash, instead of the login window made of HTML, in the web page. The second security module 322 encrypts the ID and the password input in the login window and provides the encrypted ID and password to the browser 310 so that the browser 310 forwards the encrypted authentication data to the authentication server 140. The browser 310 cannot recognize the ID and the password input in the login window. Thus, it is possible to prevent the hacking through the HTML element access or the hacking through the HTML element forgery of the BHO. The second security module 322 can prevent the hacking through the BHO browser event hooking as mentioned earlier. Meanwhile, the second security module 322 can generated using the Java applet, instead of Flash.

The third security module 323 receives the user information including the ID and the password input by the user through a input device (not shown) such as keyboard, directly from the input device, exclusively possesses the user information not to expose the user information to the operating system (OS) of the user terminal, generates and sends a fake signal of the user information to the browser 310. To monopolize the user information from the input device, the third security module 323 can include a key defense program which is a kind of the keyboard security solution. The key defense program can be installed using, but not limited to, ActiveX.

The fake signal can be generated as a certain text. The browser 310 displays the password of the fake signal in the login window. The third security module 323 encrypts the ID and the password received from the input device and provides the encrypted user information to the browser 310 so that the browser 310 forwards the encrypted authentication data to the authentication server 140. Hence, even when the BHO hacks the user information, which is the false signal, through the HTML element access, the real user information is not exposed. The user information is not exposed even to the hacking through the BHO browser event hooking. In addition, since the user information input by the user is not exposed to the OS of the user terminal 300, the leakage of the user information by the key logger in the OS level or the keyboard stroke hooking from a malicious code can be completely blocked. To send the user information from the input device to the browser 310, the user information passes through various paths. The malicious code may intercept the user information in every path. Such a hacking by the malicious code can be prevented because the third security module 323 exclusively possesses the user information and provides the fake signal and the encrypted authentication information when the browser 310 requests.

The communication network 200 can include data communication networks such as local area network (LAN), metropolitan area network (MAN), wide are network (WAN), and Internet, and telephone networks. The communication network 200 can be wired or wireless regardless of its communication scheme.

The web server 100 provides the Internet service related web page including the login page to the user terminal 300 as requested by the user terminal 300 so that the user terminal 300 displays the Internet service related web page including the login page. The web server 100 transmits the security module 320 to the user terminal 300 so that the user can log on through the security module 320 in the user terminal 300.

The web server 100 transmits one of the first, second, and third security modules 321, 322, and 323 by referring to the environment of the user terminal 300, or receives security level information set by the user from the user terminal 300 and transmits the corresponding security module 320 based on the received security level information. While the web server 100 can transmit the corresponding security module 320 in every access of the user terminal 300, the security module 320 may not be retransmitted when it is transmitted to and installed at the user terminal 300, except for the updating.

The user information database 120 is connected to the web server 100 and the authentication server 140. The user information database 120 contains user information such as ID, password encrypted, user name, resident registration number, address, and e-mail address. Herein, the user information database 120 does not contain the password per se for the sake of the security. For example, the user information database 120 contains the encrypted password using a hash algorithm such as message digest 5 (MD5). The user information database 120 provides the user information to the web server 100 and the authentication server 140 as requested by the web server 100 and the authentication server 140.

When the user authentication request; that is, the login request is received from the user terminal 300, the authentication server 140 performs the user authentication. The authentication server 140 transmits the public key and the session key to the user terminal 300. Upon receiving the encrypted authentication data from the user terminal 300, the authentication server 140 decrypts the encrypted authentication data with its private key, determines whether the decrypted session key is effective, and determines whether the user information stored in the user information database 120 matches the decrypted ID and password. In doing so, the authentication server 140 encrypts the decrypted password using the hash algorithm such as MD5 and then determines whether the encrypted password matches the encrypted password stored in the user information database 120. As the result of the authentication, the authentication server 140 transmits an authentication message to the user terminal. The authentication message is either an authentication success message or an authentication failure message. While the authentication server 140 can send the public key and the session key upon the request from the user terminal 300, the authentication server 140 may send the public key and the session key regardless of the request.

While the authentication server 140 and the user terminal 300 directly transmit and receive the public key, the session key, the authentication data, and the authentication message, all or part of the public key, the session key, the authentication data, and the authentication message can be transmitted and received by way of the web server 100. While the authentication server 140 is separately provided from the web server 100, they can be implemented as a single server.

Figure 2:
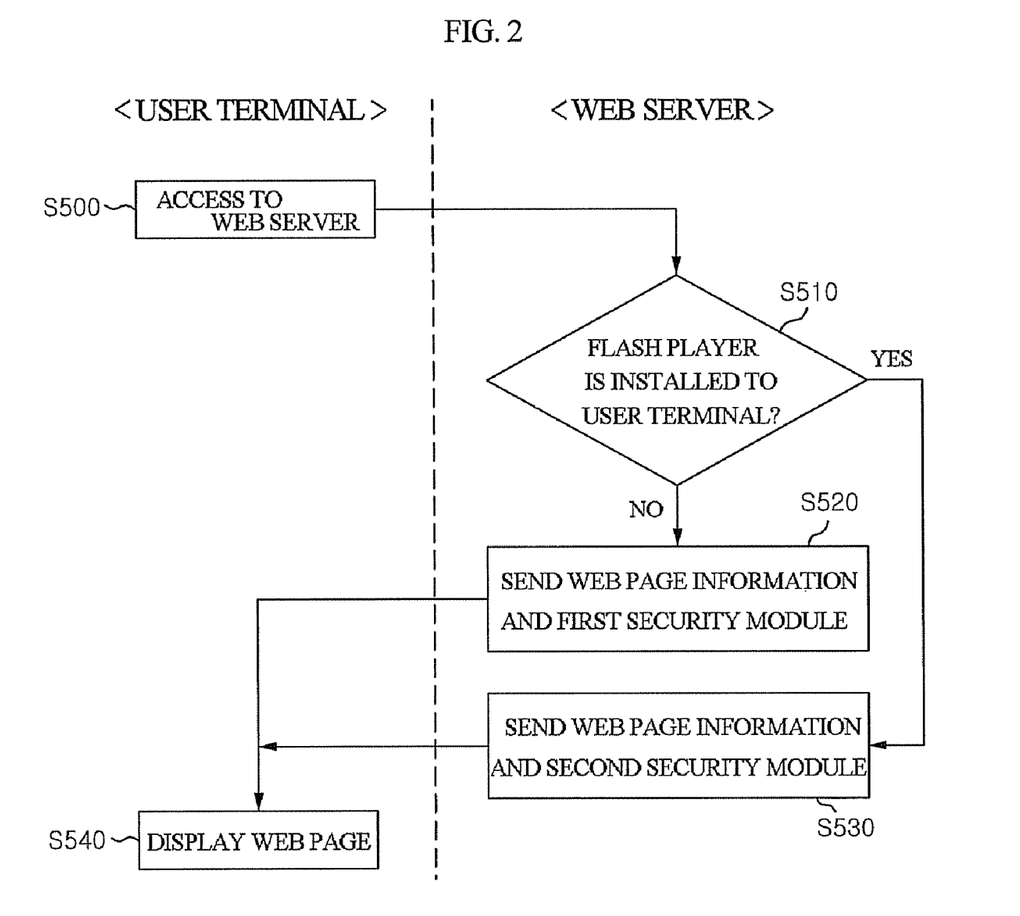
FIGS. 2 and 3 are flowcharts of a method for transmitting a security module to a user terminal according to an embodiment of the present invention.
Figure 3:
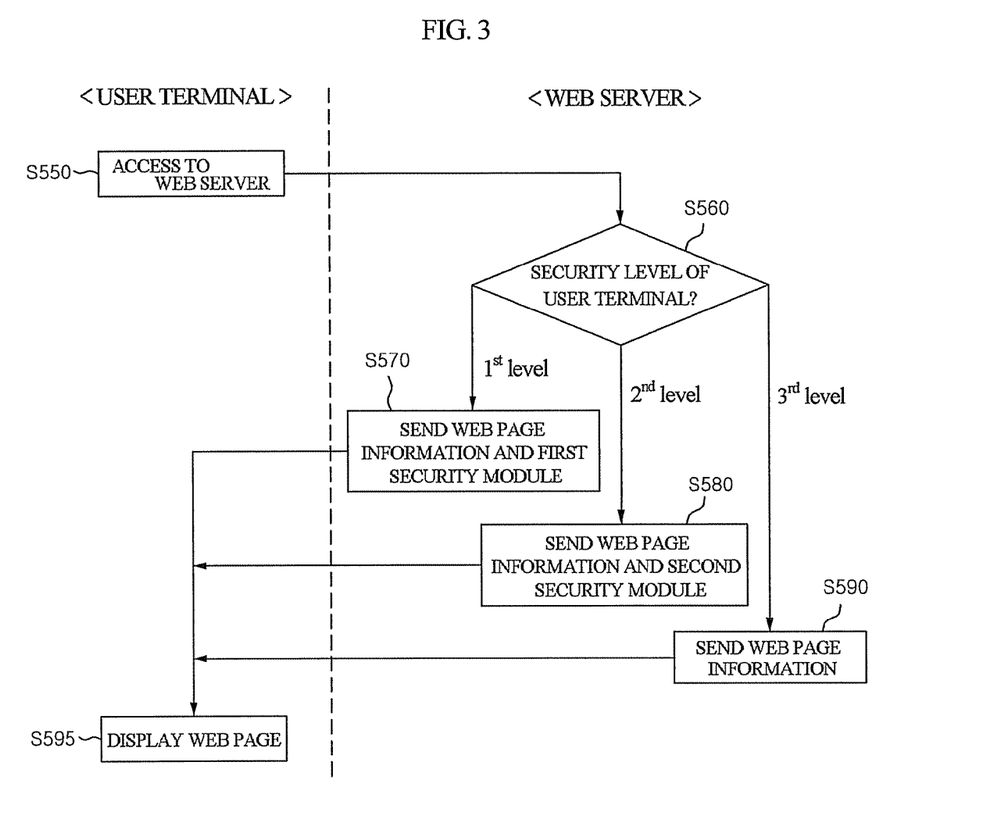

Now, descriptions explain the transmission of the security module 320 from the web server 100 to the user terminal 300 to authenticate the user at the user terminal 300 by referring to FIGS. 2 and 3.

FIGS. 2 and 3 are flowcharts of a method for transmitting the security module to the user terminal according to an embodiment of the present invention.

FIG. 2 illustrates the method for the web server 100 to send the security module 320 to the user terminal 300 when the user terminal 300 accesses to the web server 100 for the first time or when the user terminal 300 has accessed to the web server 100 before but not logged on at all.

When the user terminal 300 accesses the web server 100 (S500), the web server 100 determines whether the flash player is installed to the user terminal 300 (S510). Information about whether the flash player is installed to the user terminal 300 can be received from the user terminal 300. When the flash player is not installed to the user terminal 300, the web server 100 transmits the web page information and the first security module 321 to the user terminal 300 (S520). When the flash player is installed to the user terminal 300, the web server 100 transmits the web page information and the second security module 322 to the user terminal 300 (S530). The user terminal 300 displays the received web page (S540).

Note that the web server 100 can transmit the web page information as soon as the user terminal 300 assesses, and that the web server 100 can perform the operation S510 during or after the transmission of the web page. In this situation, there is no need to redundantly send the web page information in the operations S520 and S530.

As above, when the user terminal 300 accesses for the first time or has never logged on, the web server 100 transmits the first security module 321 or second security module 322 by taking into account the environment of the user terminal 300. Primarily, when the flash player is installed to the user terminal 300, the web server 100 sends the second security module 322 so that the user terminal 300 can log in at the higher security level of the second security level. By contrast, when the flash player is not installed to the user terminal 300, the web server 100 automatically transmits the first security module 321 so that the user can log in at the first security level. Since the installation of the third security module 323 requires the ActiveX, the third security module 323 can be transmitted only when the user selects to. If necessary, the third security module 323 can be installed to the user terminal 300 by force.

Next, FIG. 3 illustrates the method for the web server 100 to transmit the security module 320 to the user terminal 300 when the user logs in through the user terminal 300 or when the user changes the security level and its history is recorded in the login cookie.

When the user terminal 300 accesses the web server 100 (S550), the web server 100 checks the security level of the user terminal 300 (S560). In more detail, the security level of the user terminal 300 can be recorded in the login cookies of the user terminal 300. When the user terminal 300 accesses the web server 100, the web server 100 can check the security level of the user terminal 300 by reading the login cookie information. When the security level of the user terminal 300 is the first level (S560), the web server 100 transmits the web page information and the first security module 321 to the user terminal 300 (S570). When the security level of the user terminal 300 is the second level, the web server 100 transmits the web page information and the second security module 322 to the user terminal 300 (S580). When the security level of the user terminal 300 is the third level, the web server 100 transmits the web page information (S590). When the security level of the user terminal 300 is the third level, the third security module 323 is installed to the user terminal 300 already by the ActiveX. Hence, there is no need to retransmit the third security module 323, except for the updating. Yet, if necessary, the web server 100 can transmit third security module activation information to the user terminal 300 together with the web page information. The user terminal 300 displays the received web page (S595).

As mentioned earlier, the web server 100 can send the web page information as soon as the user terminal 300 accesses, and may perform the operation S560 during or after the transmission of the web page. In this situation, it is unnecessary to redundantly send the web page information in the operations S570, S580 and S590.

Figure 4:
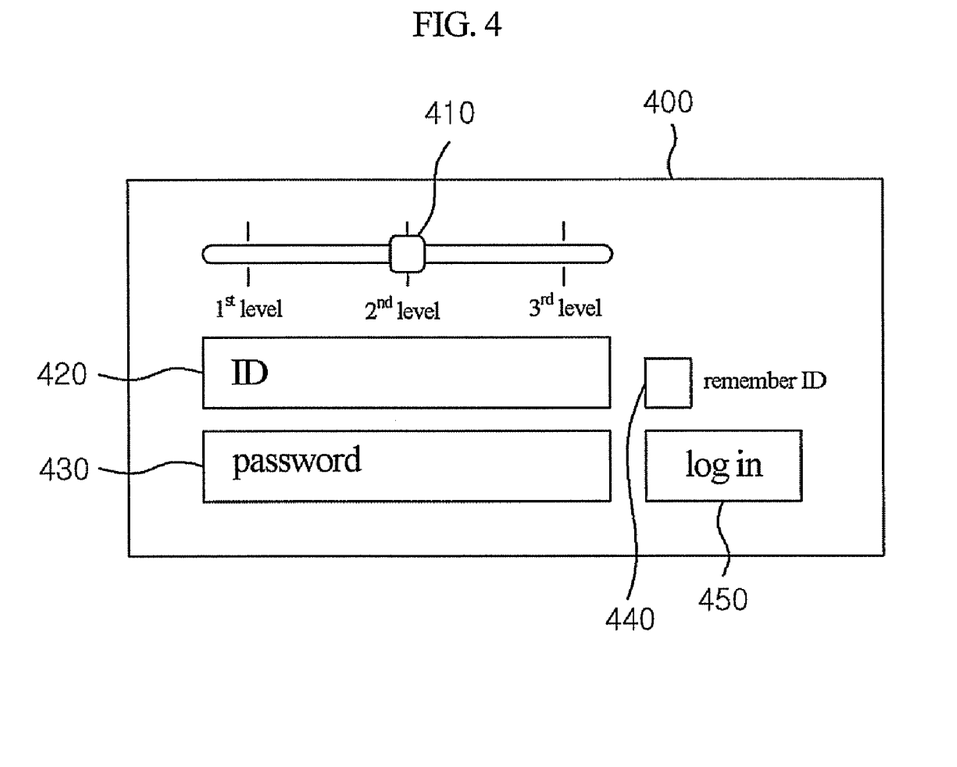
FIG. 4 is a simplified diagram of a login window displayed in the user terminal according to an embodiment of the present invention.
Figure 5:
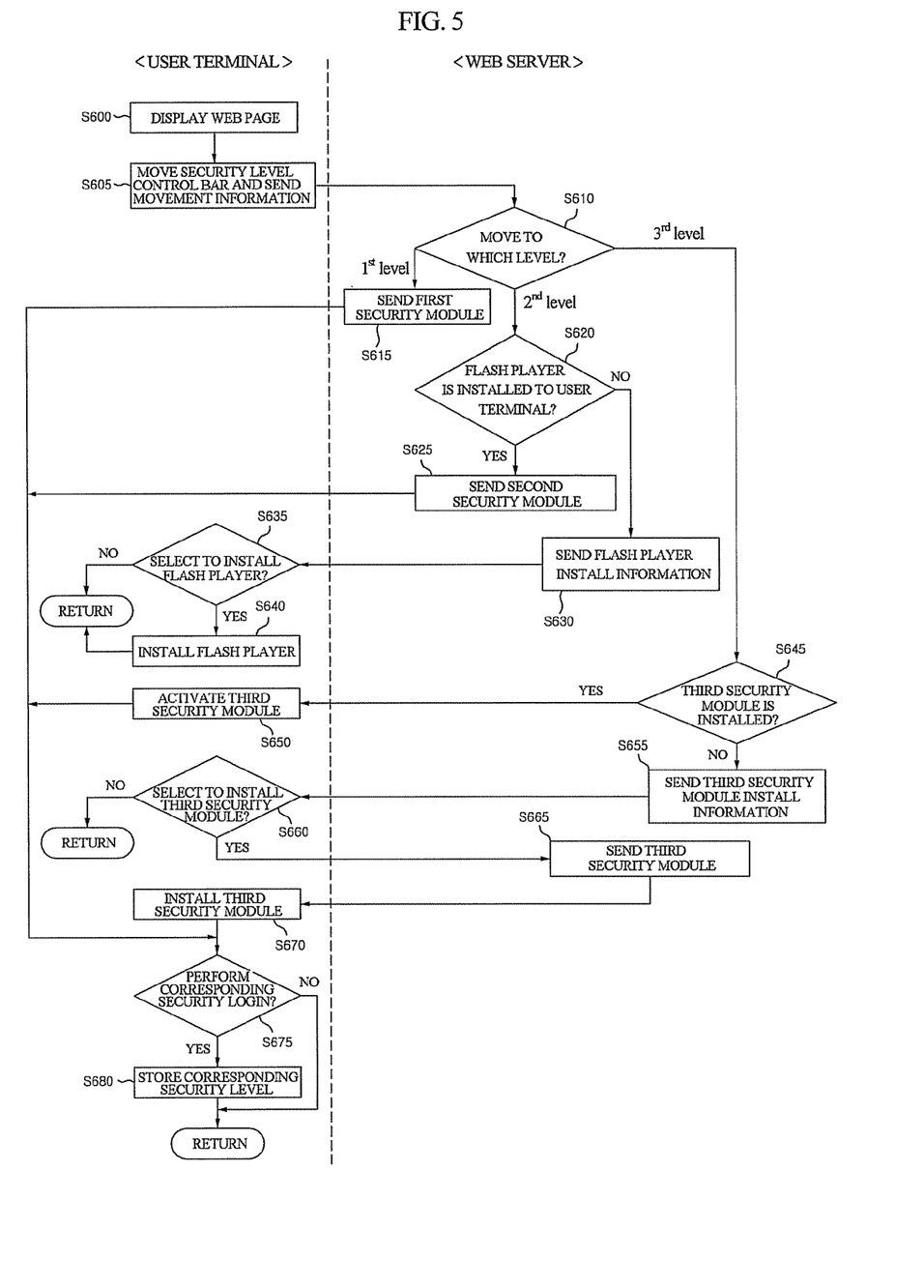
FIG. 5 is a flowchart of a method for changing a security level according to an embodiment of the present invention.

Hereafter, a method for changing the security level at the user terminal 300 is explained in detail by referring to FIGS. 4 and 5.

FIG. 4 is a simplified diagram of the login window displayed in the user terminal according to an embodiment of the present invention, and FIG. 5 is a flowchart of the method for changing the security level according to an embodiment of the present invention.

In FIG. 4, the login window 400 displayed in the web page includes a security level control bar 410, an ID input box 420, a password input box 430, an ID store check box 440, and a login button 450. Besides, the login window 400 can further include menus such as 'Create Account' and 'Forgot your ID/password?'.

The user can select his/her intended security level from the first, second, and third security levels by moving the security level control bar 410 through the mouse dragging. Alternatively, when three security level buttons are provided instead of the security level control bar 410, the user can select the corresponding security level by clicking a specific button.

The user can input his/her ID and password in the ID input box 420 and the password input box 430 respectively and then request the login by clicking the login button 450 or pressing an enter key. The ID is displayed in the ID input box 420 as input by the user, whereas the password is displayed as dark spots in the password input box 430. When the login successes while the ID store check box 440 is checked, the ID in the ID input box 420 is remembered.

For the second security level, the login window 400 is displayed by the flash. The appearance of the login window 400 is substantially similar to that of the login window 400 of the other security levels.

In FIG. 5, the user terminal 300 displays the web page including the login window 400 (S600). The security level control bar 410 of the login window 400 is placed at the current security level of the user terminal 300. When the user moves the security level control bar 410, the user terminal 300 transmits the moved security level information to the web server 100 (S605). The web server 100 transmits the corresponding security module based on the moved security level information.

When the security level of the user terminal 300 is moved to the first security level (S610), the web server 100 sends the first security module 321 to the user terminal 300 (S615). Next, when the user inputs his/her ID and password and requests the login, the login is carried out at the first security level (S675) and the first security level is store in the login cookie (S680). Accordingly, the security level of the user terminal 300 is kept as the first security level until it is changed to other security level.

When the security level of the user terminal 300 is moved to the second security level (S610), the web server 100 determines whether the flash player is installed to the user terminal 300 (S620). When the flash player is installed, the web server 100 transmits the second security module 322 to the user terminal (S625). Next, when the user inputs his/her ID and password and requests the login, the login is performed at the second security level (S675) and the second security level is stored in the login cookie (S680). Accordingly, the security level of the user terminal 300 is kept as the second security level until it is changed to other security level.

By contrast, when the flash player is not installed (S620), the web server 100 sends install information of the flash player to the user terminal 300 (S630). In response, the user terminal 300 displays a guide window informing that the flash player is usable after the installation, and displays a separate icon 'Install Flash Player' to install the flash player. When the user selects to install the flash player (S635), the flash player is installed to the user terminal 300 and the user terminal 300 returns to the previous security level. While the flash player can be provided from the web server 100, a separate external server (not shown) may provide the flash player. When the user readjusts the security level control bar 410 to the second security level in the login window 400, the security level of the user terminal 300 is set to the second security level through the operations S625, S675, and S680.

When the security level of the user terminal 300 is moved to the third security level (S610), the web server 100 determines whether the third security module 323 is installed to the user terminal 300 (S645). When the third security module 323 is installed, the web server 100 activates the third security module 323 of the user terminal 300 by sending the third security module activation information (S650). At this time, when the third security level is selected, the user terminal 300 may activate the third security module 323 by itself, rather than receiving the activation information from the web server 100. After the third security module 323 is activated, when the user inputs his/her ID and password and requests the login, the login is performed at the third security level (S675) and the third security level is stored in the login cookie (S680). Accordingly, the security level of the user terminal 300 is kept as the third security level until it is changed to other security level.

By contrast, when the third security module 323 is not installed (S645), the web server 100 sends install information of the third security module 323 to the user terminal 300 (S655). In response, the user terminal 300 displays a guide window informing that the third security module 323 is usable after the installation, and displays a separate icon 'It ActiveX' to install the third security module 323. When the user selects 'Install ActiveX' (S660), the web server 100 transmits the third security module 323 to the user terminal 300 (S665) and the third security module 323 is installed to the user terminal 300. Next, when the user inputs his/her ID and password and requests the login, the login is carried out at the third security level (S675), the third security level is stored in the login cookie (S680), and the third security level is kept up.

Meanwhile, when the security level of the user terminal 300 is set to the third security level and the third security module 323 is activated, it is possible to inform of the security under the key defense by, for example, displaying an icon indicative of the third security module 323 in a notice area of a task bar of Windows.

As above, after the user moves the security level control bar 410, the change to the corresponding security level is completed only when the user logs in at the changed security level. The security level control bar 410 in the login window 400 points the changed security level.

By contrast, when the user does not select to install the flash player (S635), the user does not select to install the third security module 323 (S660), or the user does not log in at the corresponding security level (S675), the security level of the user terminal 300 is not changed and the previous security level is maintained.

Figure 6:
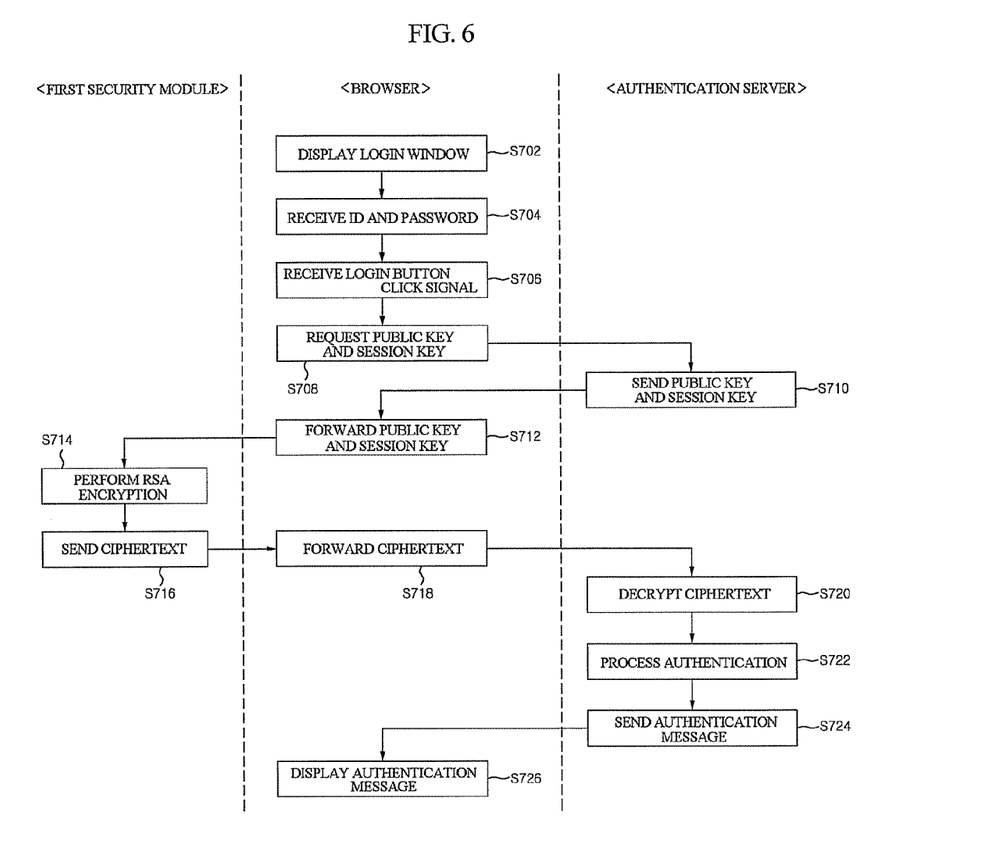
FIG. 6 is a flowchart of a user authentication method at a first security level according to an embodiment of the present invention.
Figure 7:
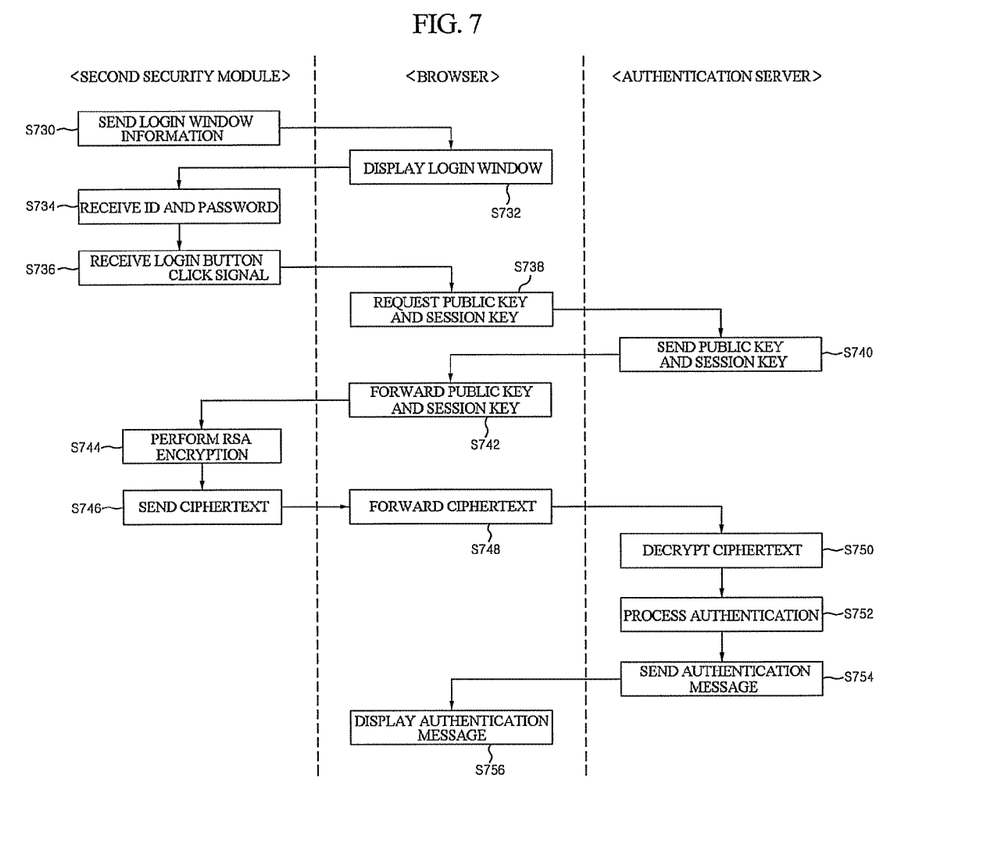
FIG. 7 is a flowchart of a user authentication method at a second security level according to an embodiment of the present invention.
Figure 8:
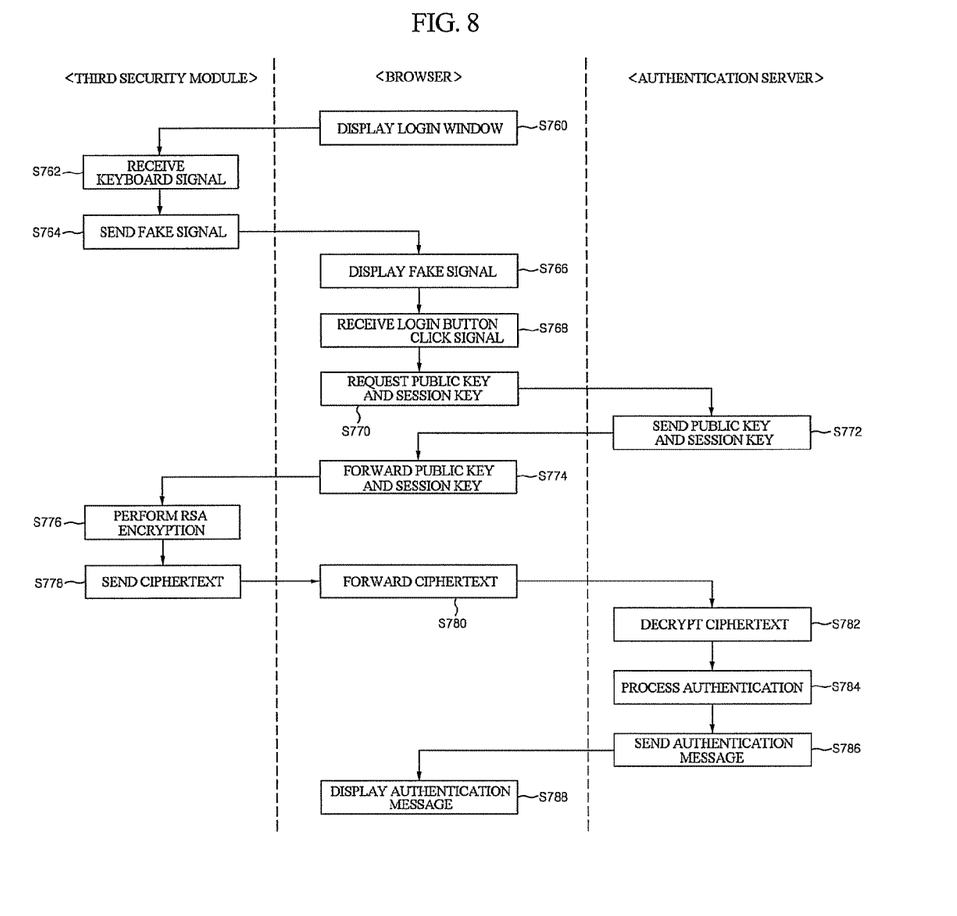
FIG. 8 is a flowchart of a user authentication method at a third security level according to an embodiment of the present invention.

The user authentication at each security level is now described in detail by referring to FIGS. 6, 7 and 8.

FIGS. 6, 7 and 8 are flowcharts of the user authentication method at the first, second, and third security levels respectively according to an embodiment of the present invention.

In the user authentication at each security level, it is assumed that the security module 320 corresponding to the security level is transmitted to or installed to the user terminal 300 in advance.

Referring first to FIG. 6, the browser 310 displays the login window 400 written with the HTML onto the user terminal 300 at the first security level (S702), and receives the corresponding signal when the user inputs his/her ID and password in the login window 400 (S704). Next, when the user clicks the login button 450 or presses the enter key, the browser 310 receives the corresponding signal (S706) and requests the public key and the session key to the authentication server 140 (S708).

The authentication server 140 sends the public key and the session key to the browser 310 (S710). The browser 310 forwards the public key and the session key received from the authentication server 140 to the first security module 321 (S712). The first security module 321 encrypts the ID, the password, and the session key with the public key (S714) and transmits the ciphertext to the browser 310 (S716). In doing so, the browser 310 may forward the ID and the password to the first security module 321 together with the public key and the session key, and the first security module 321 may acquire the ID and the password from the browser 310 in advance. The browser 310 forwards the ciphertext received from the first security module 321 to the authentication server 140 (S718).

The authentication server 140 decrypts the received ciphertext with the secret key (S720) and processes the authentication (S722). The authentication server 140 determines whether the decrypted session key is effective. When the decrypted session key is effective, the authentication server 140 determines whether the decrypted ID and the password decrypted and encrypted using the MD5 match the ID and the password store in the user information database 120. According to the result of the determination, the authentication server 140 sends the authentication success message or the authentication failure message to the user terminal 300 (S724). The authentication server 140 discards the session key used once. The browser 310 receives the authentication message from the authentication server 140 and displays the received authentication message onto the user terminal 300 (S726). In contrast, when the decryption of the ciphertext fails or the session key is not effective, the authentication server 140 sends the authentication failure message to the user terminal 300 so that the browser 310 displays the authentication failure message (S726).

Referring to FIG. 7, at the second security level, the second security module 322 transmits login window information generated by the flash to the browser 310 (S730) so that the browser 310 displays the login window 400 in the web page (S732). Next, when the user inputs his/her ID and password in the login window 400, the second security module 322 receives the corresponding signal (S734). When the user clicks the login button 450 or presses the enter key, the second security module 322 receives the corresponding signal (S736). The second security module 322 requests the public key and the session key to the authentication server 140 through the browser 310 (S738).

The authentication server 140 transmits the public key and the session key to the browser 310 (S740), and the browser 310 forwards the public key and the session key received from the authentication server 140 to the second security module 322 (S742). The second security module 322 encrypts the ID, the password, and the session key with the public key (S744) and transmits the ciphertext to the browser 310 (S746). The browser 310 forwards the ciphertext received from the second security module 322 to the authentication server 140 (S748).

Since the authentication process in the operations S750 through S756 are substantially the same as the authentication process in the operations S720 through S726 at the first security level, further descriptions shall be omitted.

Referring now to FIG. 8, at the third security level, the browse 310 displays the login window 400 written with the HTML onto the user terminal 300 (S760). When the user inputs his/her ID and password through the input device, the third security module 323 receives the corresponding signal (S762) and forwards the fake signal to the browser 310 (S764) so that the browser 310 displays the fake signal in the login window 400 (S766). Next, when the user clicks the login button 450 or presses the enter key, the browser 310 receives the corresponding signal (S768) and requests the public key and the session key to the authentication server 140 (S770).

The authentication server 140 transmits the public key and the session key to the browser 310 (S772), and the browser 310 forwards the public key and the session key received from the authentication server 140 to the third security module 323

(S774). The third security module 323 encrypts the ID, the password, and the session key with the public key (S776) and transmits the ciphertext to the browser 310 (S778). The browser 310 forwards the ciphertext from the third security module 323 to the authentication server 140 (S780).

Since the authentication process in the operations S782 through S788 are substantially the same as the authentication process in the operations S720 through S726 at the first security level, further descriptions shall be omitted.

Meanwhile, the request of the public key and the session key in the operations S708, S738, and S770 is not mandatory and thus can be omitted. In this case, the authentication server 140 can send the public key and the session key to the user terminal 300 before the login button is clicked, and the security modules 321, 322, and 323 can generate the ciphertext using the pre-received public key and the session key when the login button is clicked.

While the security level of the user terminal 300 is divided to three levels and the login is carried out using the security module 320 corresponding to the security level, the security level can be divided two levels and the login can be executed using the corresponding security module 320. More specifically, the security login at two levels may be carried out using the first and second security modules 321 and 322, the first and third security modules 321 and 323, or the second and third security modules 322 and 323. Also, the security level can include four or more levels depending on the hacking level, and the security login can be performed using the security module corresponding to the security level.

The embodiment of the present invention includes a computer-readable medium including program commands to execute operations realized by various computers. The medium contains a program or a file for executing the security module or the security authentication method aforementioned according to the present invention. The medium can contain program commands, data files, and data structures alone or in combination. Examples of the medium include a magnetic medium such as hard disk, floppy disk and magnetic tape, an optical recording medium such as CD and DVD, a magneto-optical medium such as floptical disk, and a hardware device containing and executing program commands, such as ROM, RAM, and flash memory. The medium can be a transmission medium, such as optical or metallic line and waveguide, including subcarriers which carry signals to define program commands and data structure. Examples of the program commands include a machine language created by a compiler and a high-level language executable by the computer using an interpreter.

In light of the foregoing, the web server can provide the security module adequate for the user terminal based on the environment of the user terminal, and the user information can be protected from the hacking through the security module.

Further, since the user logs in by selecting the security level based on the purpose of his/her web page access or randomly selecting his/her desired security level, the user convenience and security can be far more enhanced.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

It will be understood that, as used herein, the terms "connected" and "electrically connected" are defined to include a direct connection of two or more elements, or to include an indirect connection of two or more elements connected through one or more other elements.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first, second and third are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system comprising:
    a server configured to provide security modules for a user authentication based on security levels of a user terminal, each security module providing a different protection scheme corresponding to the respective security levels for protecting user information transmitted from the user terminal via a network; and
    an authentication server coupled to the server configured to perform a user authentication in response to detection of a user authentication request from the user terminal.

2. The system of claim 1, wherein the server is configured to determine the security levels of the user terminal whether at least one of programs is installed in the user terminal.

3. The system of claim 1, wherein the server is configured to transmit a security module corresponding to the respective security levels being provided to a user and one of the security levels being selectable by a user using a user interface.

4. The system of claim 1, wherein the authentication server is configured to send a public key and a session key to the user terminal and is configured to receive a ciphertext encrypted with the public key and the session key from the user terminal.

5. The system of claim 1, wherein each of the security modules is configured to encrypt an identification (ID) and a password associated with a user and to transmit the encrypted ID and password to the authentication server.

6. The system of claim 1, wherein the two security modules comprise
a first security module configured to be generated with a script language and executed in a web browser;
a second security module executable by a program to generate a login window to block the web browser from recognizing an identification (ID) and a password input in the login window associated with the user authentication; and
a third security module configured to be generated in the user terminal using an ActiveX to provide a fake signal to the browser upon detection of a signal associated with a login window.

7. The system of claim 6, wherein the server is configured to transmit the second security module to the user terminal if one of predetermined programs is installed in the user terminal and configured to transmit the first security module to the user terminal if none of the predetermined programs is installed in the user terminal.

8. The system of claim 6, wherein the security levels comprise a first security level, a second security level, and a third security level corresponding to the first security module, the second security module, and the third security module respectively, and
in response to detection of a selection of one of the first security level, the second security level, and the third security level, the server being configured to transmit the security module corresponding to the selected security level to the user terminal.

9. The system of claim 6, wherein the program corresponding to the second security module is configured to be executable by a flash player.

10. A method providing an authentication, the method comprising:
providing security modules corresponding to security levels of a user terminal, each security module providing a different protection scheme upon determination of a security level of the user terminal for protecting user information associated with a user authentication;
receiving a user authentication request from the user terminal via the network; and
performing a user authentication according to the determination.

11. The method of claim 10,
wherein determining the security level comprises checking if at least one of predetermined programs is installed in the user terminal.

12. The method of claim 10, wherein providing security modules comprises
transmitting one of the security modules corresponding to a security level selected by a user.

13. The method of claim 10, further comprising:
sending a public key and a session key to the user terminal; and
receiving a ciphertext encrypted with the public key and the session key from the user terminal, wherein the user authentication is performed.

14. The method of claim 10, wherein each of the security modules is configured to encrypt an identification (ID) and a password and to transmit the encrypted ID and password to an authentication server.

15. The method of claim 10, wherein the security modules comprise
a first security module configured to be generated with a script language and executed in a web browser;
a second security module executable by a program to generate a login window to block the web browser from recognizing an identification (ID) and a password input in the login window associated with a user authentication; and
a third security module configured to be generated in the user terminal using an ActiveX to provide a fake signal to the browser upon detection of a signal associated with a login window.

16. The method of claim 15, wherein transmitting the security module comprises
transmitting the second security module to the user terminal if the program is installed in the user terminal, and
transmitting the first security module to the user terminal if none of the predetermined program is installed in the user terminal.

17. The authentication method of claim 10, wherein the security levels comprise a first security level, a second security level, and a third security level corresponding to the respective security modules comprising a first security module, a second security module, or a third security module respectively, and
in response to detection of a one of the first security level, the second security level, and the third security level, the server transmits the security module corresponding to the selected security level to the user terminal.

18. The method of claim 15, wherein the program corresponding to the second security module is configured to be executable by a flash player.

19. A non-transitory computer-readable medium carrying one or more instructions for authenticating user information associated with a computer program that, when executed by one or more processors, cause the one or more processors to perform the steps of:
providing security modules corresponding to security levels of a user terminal, each security module providing a different protection scheme upon determining of a security level of the user terminal for protecting user information associated with a user authentication;
receiving a user authentication request from the user terminal via the network; and
performing a user authentication according to the determination.

20. A system comprising:
a server configured to protect user information by providing security modules comprising a first security module, a second security module and a third security module upon determining of security levels of a user terminal associated with a user authentication, the first security module generated in which a browser displays a login window to the user terminal and the second security module generated in which the second security module transmits a login window being generated by a flash to the browser to display the login window, and the third security module in which the browser displays the login window to the user terminal and transmits a fake signal to the browser to display the fake signal in the login window; and an authentication server coupled to the server via a network configured to perform a user authentication according to the determination and in response to detection of a user authentication request from the user terminal.

\* \* \* \* \*